United States Patent Office

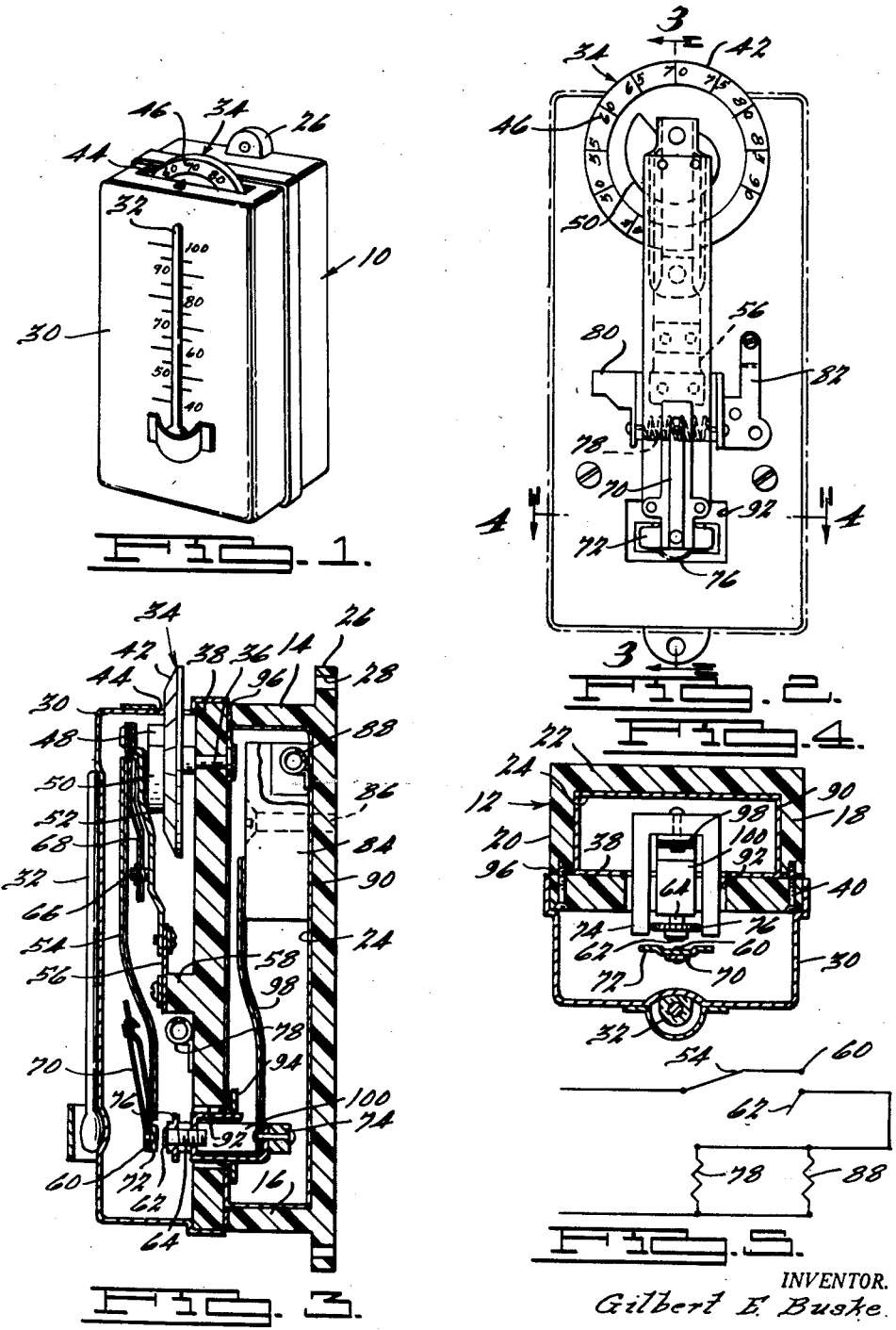

2,706,229
Patented Apr. 12, 1955

2,706,229

COMPENSATING THERMOSTAT

Gilbert E. Buske, Mason, Mich.

Application July 22, 1954, Serial No. 445,033

4 Claims. (Cl. 200—122)

This invention relates to thermostats and, more particularly, to an improved thermostat of the type adapted to control the temperature in a room or other space. Conventional room thermostats usually include a bimetal or other temperature sensing means which is so constructed and arranged that when the temperature of the space under control drops below a predetermined point, the temperature sensing means effects closure of electrical contact means to complete an electrical circuit. Completion of such circuit causes the source of heat for the room, as for example a furnace, to function, thereby increasing the supply of heat to the room.

When heat is added to the room, the temperature begins to rise and after the temperature rises a predetermined amount, the temperature sensing means causes the contacts to open, thereby opening the electrical circuit to the furnace and stopping the operation of the furnace. In order to hasten the opening of the contacts and thus reduce undesirable temperature overshooting, it has been common practice to provide a relatively small heater unit for the purpose of heating the bimetallic temperature sensing means, such heater being known as an anticipating heater.

It is well known that when the temperature outside a building falls, the temperature of the outer walls of the building also falls, and that due to increased heat transfer from room occupants to these colder surfaces, a higher room temperature is required if equal comfort is to be maintained. However, conventional thermostats having anticipating heaters have been subject to the defect that the opposite result is obtained. On a relatively cold day, the thermostat contacts will be closed for greater percentages of time than on a relatively warm day and more heat per hour will be supplied by the anticipating heater. This raises the temperature of the thermostat above the temperature in the room with the result that the room air temperature is actually lowered slightly on a cold day. In order to overcome these disadvantages, elaborate and relatively expensive means have been employed. For example, dual temperature sensing means have been employed, one sensing means being located outside of the building while the other sensing means is located inside the building. The two sensing means are connected to a common unit responsive to both sensing means whereby a ratio control is effected so that on a cool day the room temperature will be maintained higher than on a warm day. However, the location of the dual sensing elements is critical if the system is to function properly, and because of the complexities of the system, the cost is relatively high.

An object of the present invention is to overcome disadvantages in prior thermostats and to provide an improved thermostat incorporating improved means for automatically varying the temperature of the controlled space as a function of the heating or cooling load.

Another object of the invention is to provide an improved thermostat which is adapted to control the temperature of a space in accordance with the comfort requirements of the occupants rather than in accordance with fixed temperature requirements.

Another object of the invention is to provide an improved thermostat that is economical to manufacture and assemble, durable, efficient and reliable in operation.

Still another object of the invention is to provide an improved thermostat which may be easily and quickly installed and maintained with a minimum of time, labor and expense.

The above as well as other objects and advantages of the present invention will become apparent from the following description, the appended claims and the accompanying drawing wherein:

Figure 1 is a perspective view of a thermostat embodying the present invention;

Fig. 2 is a front elevational view of the thermostat illustrated in Fig. 1, showing the front cover removed therefrom;

Fig. 3 is a sectional elevational view of the thermostat illustrated in Fig. 2, taken on the line 3—3 thereof;

Fig. 4 is a transverse sectional view of the structure illustrated in Fig. 2, taken on the line 4—4 thereof;

Fig. 5 is a schematic wiring diagram showing a portion of the wiring utilized with a two-wire circuit.

Referring to the drawing, the present invention is shown incorporated in a two-wire bimetallic type room thermostat, generally designated 10, which is adapted to control a heating plant that heats the space under control, although it will be understood that the present invention is applicable to other uses. The thermostat 10 is comprised of a base 12 which is preferably made of plastic or other relatively low heat-conducting material. The base 12 includes top and bottom walls 14 and 16 integrally joined by side walls 18 and 20 and a back wall 22 and defines a chamber 24. In order that the base 12 may be conveniently mounted on a wall of a room, a pair of outwardly projecting tangs 26 are provided which are integrally joined to the base 12 and which define openings 28 adapted to receive screws or other fastening devices. A closure member 30 is provided which is adapted to be secured to a plate 38 which extends transversely of the base 12 in spaced substantially parallel relationship with respect to the back wall 22 thereof and is fixed to the side walls of the base as by screws 40. The closure member 30 carries a thermometer 32 that serves to indicate the ambient temperature of the space.

A dial 34 is provided which is rotatably mounted on a pin 36 having one end portion thereof secured to the plate 38 by any suitable or conventional means. The dial 34 includes a section 42, which, in the preferred embodiment illustrated, is shaped in the form of a truncated cone and which projects outwardly through a slot 44 provided in the top wall of the closure member 30, suitable indicia 46 being provided on the sloping surface of the section 42 to indicate the temperature setting of the thermostat. The dial 34 is also provided with a cam section 48 having a cam surface 50 which bears against the central portion of an actuating member 52. One end portion of the actuating member 52 is fixed to a bimetallic element 54 while the opposite end portion of the actuating member 52 is fixed to one end portion of a flexible member 56, the distal end portion of the member 56 being fixed to a boss 58 provided on the wall 38. With such a construction, when the dial 34 is rotated, the cam surface 50 bears against the actuating member 52, thereby causing the flexible member 56 to flex to the right or left, as viewed in Fig. 3, depending upon the direction of rotation of the dial 34. An electrical contact 60 is provided which is carried adjacent the lower end portion of the bimetallic element 54 and the contact 60 is adapted to make and break with a contact 62 carried by a calibrating screw 64. Thus the position of the dial 34 together with the temperature of the bimetallic element 54 determines whether or not the contacts 60 and 62 will be in the open or closed position. An adjusting screw 66 threadably engages one end of a support member 68, the opposite end portion of which is fixed to the bimetallic element 54 and the actuating member 52. The adjusting screw 66 bears against the actuating member 52 and permits the thermostat to be calibrated so that the temperature at which it controls will agree with the setting of the dial 34.

A flexible strip 70 is provided which carries the contact 60, the strip 70 having a light preload against an armature 72. The armature operates in conjunction with a magnet 74 to provide snap action to eliminate contact chatter in a well-known manner, the contact 60 having a limited amount of travel toward the armature 72.

As previously mentioned, the contact 62 is carried by a calibrating screw 64, and the calibrating screw 64 also carries a sensitivity dial 76 which is disposed between the poles of the magnet 74 so that the distance between armature 72 and the poles of the magnet 74 when the contacts are closed can be varied, thus varying the temperature change required to open and close the contacts 60 and 62.

An anticipating heater 78 is provided which is electrically connected to terminal members 80 and 82 mounted on the plate 38. The anticipating heater 78 is energized when the contacts 60 and 62 are closed and heats the bimetallic element 54. The anticipating heater 78 may be of any suitable or conventional type. For example, the anticipating heater 78 may be of the variable resistance, slide wire type or it may be of the fixed resistance composition type.

According to the present invention, a block 84 is provided which is mounted in the chamber 24 and secured to the back wall of the base 12, as by screws 86. The block 84 may be formed of any material having relatively high heat storage capacity characteristics, as for example cast zinc. The block 84 is heated by a heater 88 similar in kind but not necessarily in size to the anticipating heater 78. Like the heater 78, the heater 88 may be of the slide wire type so that the amount of heat supplied thereby may be varied, or the heater 88 may be of the composition type and of fixed resistance. The heater 88 is also energized when the contacts 60 and 62 are closed, the heater 88 being connected in parallel with the heater 78 in the preferred embodiment illustrated. In order to reduce the heat losses from the block 84 and the chamber 24, insulating material such as metal foil 90 may be fixed to the inner surfaces of the base 12 and the plate 38 defining the chamber 24, the plate 38 serving to more or less completely close the chamber 24. While the magnet 74 projects through an opening 92 in the plate 38, the clearance between the magnet 74 and the opening 92 is reduced to a minimum and a baffle 94 is provided which is carried by the magnet 72 to further block the opening 92 to the passage of heat. A gasket 96 is interposed between the plate 38 and the peripheral portion of the base 12 to seal the junction therebetween.

A bimetallic element 98 is provided having one end portion thereof fixed to the block 84. The bimetallic element projects downwardly in the chamber 24, as viewed in Fig. 3, and the lower end portion thereof is fixed to the magnet 74 and a support piece 100 which carries the calibrating screw 64, the position which the bimetallic element 98 assumes in the chamber 24 being determined by the temperature in the chamber 24.

The operation of the thermostat is perhaps best understood by considering the operation in increments. Assuming first that the temperature outside the building is relatively cold so that the heat demand is great, and further assuming that the space controlled by the thermostat has just cooled sufficiently so that the bimetallic element 54 has carried the armature 72 sufficiently close to the magnet 74 so that the magnet 74 attracts the armature 72, closure of the contacts 60 and 62 will be effected. Closure of the contacts 60 and 62 energizes the source of heat to the space and also energizes the anticipating heater 78 and the compensating heater 88. The heater 78 supplies heat to the bimetallic element 54 which heat, together with the heat supplied to raise the space air temperature, results in the opening of the contacts 60 and 62. However, during the time that the contacts 60 and 62 are closed, heat is also supplied to the chamber 24 and the block 84 by the compensating heater 88. As a result, the chamber 24 and the bimetallic element 98 are also warmed and the action of the bimetallic element 98 is such that it positions the contact 62 toward the contact 60 with the result that a higher room temperature is required before the contacts 60 and 62 open than would have been the case without the action of the bimetallic element 98. Because of the storage of heat in the chamber 24 due to the heat storing function of the block 84 and the thermal insulation previously described, the bimetallic element 98 remains at an elevated temperature and the contact 62 remains positioned toward the contact 60. Thus as the room and bimetallic element 54 cool, the contacts 60 and 62 close at a higher room temperature than would have been the case without the action of the bimetallic element 98.

Assuming now that the temperature outside the building becomes warmer, there will be less heat loss from the building and, consequently, in order to maintain the same room temperature, the source of heat will operate for a lesser number of minutes per hour. In this case, with a lesser number of minutes of heat per hour supplied to the chamber 24 and the block 84 by the compensating heater 88, and a greater amount of time for dissipation of such heat, the chamber 24, the block 84 and the bimetallic element 98 will be at a lower temperature. This will result in the bimetallic element 98 moving to the right, as viewed in Fig. 3, so as to position the contact 62 away from the contact 60 with the result that the room air temperature and the bimetallic element 54 must be at a lower temperature before the contacts 60 and 62 close.

From the above description it will be apparent that by means of the present invention, a thermostat may be so constructed that it will automatically adjust the temperature of the space under control in proportion to the heat losses from such space. On a cold day, the space will be heated to a higher temperature than on a warm day, thus maintaining equal comfort for the occupants of the space. By varying the size and wattage of the heater 88, as well as the heat storing capacity of the block 84 and the thermal insulation of the chamber 24, varying amounts of compensation may be obtained. In practice, it has been found desirable to vary the wattage of the heater 88 to meet the individual requirements of the particular installation.

It has been found that compensation of the type disclosed in the present application has other usages, such as in controlling the cooling of a space. On a very warm day when a greater amount of cooling is required, a thermostat embodying the present invention will automatically control the room at a higher temperature, thus reducing the shock of the temperature change when an individual enters or leaves the room. Furthermore, a thermostat embodying the present invention may be applied to the limit switch control of a furnace so that the air temperature furnished to the room will be higher on a cold day. It is also possible to reverse the action of the bimetallic element 98. In this case, when applied to a heating load, the room temperature will be reduced as the outside temperature falls.

Although this invention has been described as applied to a two-wire bimetallic type room thermostat having separable contacts, it is not intended that the present invention be limited only to these elements. It will be readily apparent to those skilled in the art that the present invention may be applied equally well to a three or more wire system, and that a Bourdon tube or bellows filled with fluid or other temperature responsive means may be used in place of the bimetallic elements. Furthermore, various other single or multiple separable contacts may be employed, and it will be apparent to those skilled in the art that the present invention may be applied to thermostats using mercury or other type switches.

While a preferred embodiment of the invention has been shown and described, it will be understood that various other changes and modifications may be made without departing from the spirit of the invention.

What is claimed is:

1. In an electrical thermostat, a base defining a chamber, means thermally insulating said chamber, a pair of electrical contacts, means responsive to the temperature outside of said chamber for opening and closing said contacts to open and close an electrical circuit, heating means in said chamber operable when said circuit is closed, means for storing heat in said chamber, means responsive to the heat supplied by said heating means and operable in conjunction with said first means to vary the position of one of said contacts relative to the other of said contacts as a function of the percentage of time that said circuit is closed.

2. An electrical thermostat comprising, in combination, a base defining a chamber, means thermally insulating said chamber, a pair of electrical contacts outside of said chamber, means including a bimetalic element responsive to the temperature outside of said chamber for opening and closing said contacts to open and close an electrical circuit, a first heating element disposed in heat exchange relationship with respect to said bimetallic element and operable when said circuit is closed, a second heating element in said chamber operable when said circuit is closed, means for storing heat in said chamber, means responsive to the heat supplied by said second heating element and operable in conjunction with said first means to vary the position of one of said contacts relative to the other of said contacts as a function of the percentage of time that said circuit is closed.

3. An electrical thermostat including, in combination, a base defining a chamber, means thermally insulating said chamber, a pair of electrical contacts, means including a bimetallic element responsive to the temperature outside of said chamber for opening and closing said contacts to open and close an electrical circuit, a first heating element disposed in heat exchange relationship with respect to said bimetallic element and operable when said circuit is closed, a second heating element in said chamber operable when said circuit is closed, means for storing heat in said chamber, and means including a bimetallic element responsive to the heat supplied by said second heating element and operable in conjunction with said first means to vary the position of one of said contacts relative to the other of said contacts as a function of the percentage of time that said circuit is closed.

4. In an electrical thermostat, the combination including a base defining a chamber, means for thermally insulating said chamber, a pair of electrically separable contacts outside of said chamber, means including a bimetallic element responsive to the temperature outside of said chamber for opening and closing said contacts to open and close an electrical circuit, a first electrical heating element disposed in heat exchange relationship with respect to said bimetallic element and operable when said circuit is closed, a second electrical heating element in said chamber energized when said circuit is closed, means for storing heat in said chamber, and means including a bimetallic element in said chamber responsive to the heat supplied by said second heating element and operable in conjunction with said first means to vary the position of one of said contacts relative to the other of said contacts as a function of the percentage of time that said circuit is closed.

References Cited in the file of this patent

UNITED STATES PATENTS

| | | |
|---|---|---|
| 2,216,748 | Lindemann | Oct. 8, 1940 |
| 2,303,153 | Woodworth | Nov. 24, 1942 |
| 2,543,707 | Prouty | Feb. 27, 1951 |
| 2,635,156 | Welter | Apr. 14, 1953 |